United States Patent [19]

Miyake et al.

[11] Patent Number: 4,508,779

[45] Date of Patent: Apr. 2, 1985

[54] ENAMELLED WIRE

[75] Inventors: Masayoshi Miyake; Isao Ueoka; Munetaka Kawaguchi; Hirohiko Nakabayashi; Teruyuki Yamamoto, all of Aichi, Japan

[73] Assignee: Sumitomo Electric Industries, Ltd., Osaka, Japan

[21] Appl. No.: 389,800

[22] Filed: Jun. 18, 1982

[30] Foreign Application Priority Data

Jun. 18, 1981 [JP] Japan .................................. 56-94757

[51] Int. Cl.[3] .......................... B32B 27/00; H01B 7/00

[52] U.S. Cl. ............................ 428/383; 174/110 PM; 174/120 SR; 428/379

[58] Field of Search ........................ 428/375, 379, 383; 174/110 SR, 110 PM, 120 C, 120 SR

[56] References Cited

U.S. PATENT DOCUMENTS 3,523,820 8/1970 Sheffer .......................... 174/120 SR 3,917,892 11/1975 Kawaguchi et al. ............... 428/383

3,922,465 11/1975 Kawaguchi et al. ............... 428/383

4,268,659 5/1981 Bederke ......................... 174/110 SR

FOREIGN PATENT DOCUMENTS 572396 3/1959 Canada ................................ 174/110

OTHER PUBLICATIONS

Noller, "Chemistry of Organic Compounds" 3rd edition, 1965, pp. 177 and 205–209.

*Primary Examiner*—Lorraine T. Kendell

*Attorney, Agent, or Firm*—Sughrue, Mion, Zinn, Macpeak and Seas

[57] ABSTRACT

An enamelled wire comprising a layer of baked insulation formed on the conductor either directly or through another insulation can be produced by applying to at least the outermost layer of the wire a wire enamel composition consisting essentially of a polyester resin at least one molecule of which is terminated with a straight alkyl group having 21 or more carbon atoms, and drying the same.

10 Claims, No Drawings

ENAMELLED WIRE

BACKGROUND OF THE INVENTION

The present invention relates to enamelled wires having good self-lubricating properties.

Recently, manufacturers of electric apparatuses that use enamelled wires have come to use high-speed automatic winding machines to increase the speed of the production line. But during winding, the enamelled wire is subjected to friction and other mechanical stress and the insulation coating is damaged mechanically. If such damaged wire is assembled in an electric machine, layer shorting (short-circuiting between wires) occurs and the loss factor is increased to an undesirably high level. Therefore, to minimize the mechanical damage to the insulation coating, enamelled wires having good self-lubricating properties have been demanded. This demand should be met not only by the automatic winding machine but also when enamelled wires are inserted manually into a small slot in a motor. Since enamelled wires themselves do not have good self-lubricating properties, this demand has been met by coating the enamelled wire with a layer or various liquid lubricants such as liquid paraffin and refrigerator oil. The problem of vulnerability of enamelled wires to mechanical damage during winding has been partially solved by providing them with a nylon or polyamideimide overcoat having great mechanical strength or high scrape resistance.

However, to achieve further energy saving, additional improvement in the efficiency of various motors and transformers is desired, and this requirement is particularly great for motors immersed in refrigerants for coolers, air conditioners and refrigerators, and to meet this end, the space factor is increased by inserting more enamelled wires into the small slot in motors. For motors that are immersed in refrigerants, enamelled wires with a polyester imide or polyamideimide overcoat having not only high mechanical strength and scrape resistance but also high refrigerant resistance have conventionally been used. In addition, enamelled wires with a nylon overcoat have begun to be used in recent years. Damage to the insulation coating during winding has been prevented and the efficiency of inserting a coil of enamelled wires into the slot has been increased solely by coating the enamelled wires with refrigerator oil. But as more enamelled wires are inserted into the small slot to increase the space factor, hence the efficiency of motors, many problems have arisen that can hardly be solved by the conventional enamelled wires coated with liquid lubricants such as refrigerator oil. For one thing, liquid lubricants such as refrigerator oil do not have very high self-lubricating properties and slip properties, so a desired great number of enamelled wires cannot be inserted into the small slot, and if they are inserted with great force, the enamel coating is damaged mechanically to increase the chance of layer shorting. The low self-lubricating properties of the enamelled wire causes another disadvantage in that even after the coil of enamelled wire is inserted in the motor, the enamel coating is subjected to mechanical damage due to electromagnetic vibration, and as a result, layer shorting occurs and the motor fails to perform its function. Improving the self-lubricating properties of enamelled wires by applying a large quantity of liquid lubricants is little effective, and on the contrary, more dirt collects on the enamelled wires and the bonding strength of adhesive tape used to fix the end of the coil is adversely affected.

Attempts have been made to eliminate these defects by coating enamelled wires with solid lubricants such as solid paraffin and carnauba wax having better lubricating properties and slip properties than liquid lubricants. But if the enamelled wires having a coating of these solid lubricants are applied to motors immersed in refrigerants, the lubricant coating is extracted with the refrigerant and can clog the opening of the compressor valve or the refrigerant expansion nozzles in the refrigerator, to thereby reduce the refrigerating capacity of the machine. In addition, if the lubricant is extracted with the refrigerant, the self-lubricating properties and slip properties of the enamelled wire are reduced and the enamel coating becomes vulnerable to mechanical damage due to electromagnetic vibration. Furthermore, the solid lubricants are applied to the enamelled wire from a solution having a few percents of the lubricant dissolved in solvents such as petroleum benzine and xylene, but using a large quantity of low-boiling solvents is not only hazardous to human health but it also produces electric wires with creasing that do not have commercial value, and therefore, the coating of solid lubricants can only be applied to limited types of electric wires.

Another method that has been proposed for providing enamelled wires with high self-lubricating properties is to use enamel insulating paint compositions containing synthetic resins having good lubricating properties such as polyethylene, polypropylene and polytetrafluoroethylene, silicone oil, fluorine containing surfactants, and liquid as well as solid lubricants such as paraffin wax, carnauba wax and montan wax. But synthetic resins such as polyethylene, polypropylene and polytetrafluoroethylene are sparingly soluble in wire enamel compositions and are difficult to disperse in the wire enamel uniformly, and the resulting enamel is not highly stable. What is more, these resins are not highly miscible with the insulating components of the enamel so they are difficult to disperse in the insulation coating uniformly and the resulting enamel coating does not have good appearance. Liquid lubricants in the wire enamel composition provide an insulation coating whose slip properties and self-lubricating properties are as low as those of the coating formed by applying them onto the enamelled wire. Solid lubricants in the wire enamel composition are sometimes extracted with refrigerants or solvents after the wire enamel is applied to the electric wire (the same thing happens when solid lubricants are directly applied to the enamelled wire), and the enamelled wire so produced is difficult to apply to motors that are used in refrigerants. Furthermore, like synthetic resins, the solid lubricants are sparingly soluble in solvents for making wire enamel and they are not highly miscible with the insulating components of the enamel. Therefore, the resulting wire enamel is not stable and the lubricants are difficult to disperse in the insulation coating uniformly and hence the so produced coating does not have good appearance.

SUMMARY OF THE INVENTION

As a result of various studies to eliminate the above defects of the conventional enamelled wires, it is found that a desired enamelled wires comprising a layer of baked insulation formed on the conductor either directly or through another insulation can be produced by applying to at least the outermost layer of the wire a wire enamel composition consisting essentially of a polyester resin at least one molecule of which is terminated with a straight alkyl having 21 or more carbon atoms, and baking the same. The enamelled wire of the present invention itself has self-lubricating properties equal to those of the wire that has a layer of solid lubricants such as solid paraffin and carnauba wax, or those of the wire that is produced by coating the conductor with a wire enamel composition containing such solid lubricants or synthetic resins such as polyethylene and polypropylene having good lubricating properties.

In the enamelled wire of the present invention, the wire enamel itself has high self-lubricating properties, and in this respect, it differs greatly from the conventional product wherein a lubricant is present on the surface of the enamelled wire or within the enamel. What is more, the enamel of the wire of the present invention is not a simple blend of components, so the coating itself has great strength that withstands mechanical damage that might occur when a number of wires are inserted into the small slot of motors. Therefore, the enamelled wire of the present invention has a better appearance than enamelled wires having an enamel coating made from wire enamel compositions containing synthetic resins having good lubrication properties such as polyethylene and polypropylene. There is little chance that the enamel coating of the present invention also will be extracted with refrigerants or solvents and clog the opening of the compressor valve or the refrigerant expansion nozzles in comparison with the enamel coating formed by applying solid lubricants such as solid paraffin or carnauba wax on the surface of the enamelled wire or the coating formed from a wire enamel composition containing these solid lubricants. For these reasons, the enamelled wire of the present invention can be applied with advantage to motors that are immersed in refrigerants and which hence are required to have high refrigerant resistance.

DETAILED DESCRIPTION OF THE INVENTION

It is essential for the present invention that a wire enamel composition consisting essentially of a polyester resin at least one molecule of which is terminated with a straight alkyl group having 21 or more carbon atoms be applied and baked to form at least the outermost layer of an enamelled wire. This is necessary for achieving the object of the present invention, namely the production of an enameled wire having good self-lubricating properties. The wire enamel composition used in the present invention is applied to the conductor either directly or through another insulation and baked. The resulting resin coating may be thin but it exhibits very good self-lubricating properties and is very strong to thermal and mechanical damage, so it is effectively used as a protective coating on another insulation having low self-lubricating properties. Insulation coating that can be protected with the insulation coating of the present invention include every type of insulating material such as polyurethane, polyvinyl formal, polyester, polyester imide, polyhydantoin, polyamideimide, polyester amideimide, polyhydantoin ester or polyester amide. Since the insulated wire of the present invention may be applied to motors immersed in refrigerants, insulating materials conventionally used to form refrigerant-resistant insulated wires are preferred, such as polyester, polyester imide and polyester amideimide.

The polyester resin used in the present invention at least one molecule of which is terminated with a straight alkyl group having 21 to more carbon atoms can be prepared by reacting a polyhydric alcohol (hereunder referred to as component (i)), a polybasic carboxylic acid or its derivative (hereunder referred to as component (ii)) and a compound that has a straight alkyl group having 21 or more carbon atoms in the molecule and which has a functional group capable of reaction with either component (i) or (ii) (hereunder referred to as component (iii)).

The wire enamel used in the present invention must form a resin coating that undergoes a high degree of polymerization during baking, and theoretically, components (i) and (ii) are preferably used in such amounts that component (i) has a hydroxyl equivalent equal to the carboxyl equivalent of component (ii). However, in actual operation, a side reaction such as removal of polyhydric alcohol occurs during baking at elevated temperatures, so the two components are more preferably used in such amounts that the hydroxyl equivalent is in excess of the carboxyl equivalent. But if the control of the degree of polymerization is necessary, component (ii) may be used in such an amount that the carboxyl equivalent is in excess of the hydroxyl equivalent.

Components (i), (ii) and (iii) may be reacted in any order: for example, component (i) or (ii) is first reacted with component (iii), then with component (ii) or (i); or components (i) and (ii) are first reacted, then with component (iii); alternatively, the three components may be reacted simultaneously.

Component (iii) is preferably used in an amount of 0.4 to 0.6% by weight of the resin obtained. If its amount is less than 0.4% by weight of the resin obtained, the desired lubricating properties are not obtained, and if its amount exceeds 6.0% by weight, the resulting enamel does not remain stable during storage and the electric wire coated with such wire enamel does not have the desired appearance or mechanical properties. The range of from 0.4 to 4.0% by weight is particularly preferred because a stable wire enamel composition and a wire having good appearance can be produced.

The term "resin obtained" as used herein means a resin whose amount is theoretically calculated on the assumption that the hydroxyl equivalent of component (i) is equal to the carboxyl equivalent of component (ii). Therefore, the polyhydric alcohol used in excess in the initial stage of synthesis is not counted as a resin component since it is eliminated during the synthesis and the subsequent baking step. Strictly speaking, the equivalent weight of the functional group in component (iii) should be counted in for calculating the amount of the resin obtained, but for the purpose of the present invention, component (iii) may be used in a very small amount with respect to component (i) or component (ii), so the equivalent weight of the functional group of component (iii) is substantially negligible.

The method of calculating the amount of component (iii) with respect to the resin obtained is described by reference to the following formulation of components (i), (ii) and (iii):

| | | |
|---|---|---|
| Component (i): | Ethylene Glycol | 93.1 g (1.5 moles, 3.0 equivalent) |
| | Glycerin | 92.1 g (1.0 mole, 3.0 equivalent) |
| Component (ii): | Dimethyl Terephthalate | 388.4 g (2.0 moles, 4.0 equivalent) |

-continued

| | | |
|---|---|---|
| Component (iii): | Methyl Behenate | 3.4 g (0.01 mole, 0.01 equivalent) |
| Equivalent of component (i) = 1.5 × 2 + 1.0 × 3 = 6 | | |
| Equivalent of component (ii) = 2.0 × 2 = 4 | | |

If it is assumed that the excessive 2 equivalents of hydroxyl group are eliminated in the form of ethylene glycol with a lower boiling point than glycerin, the amount of ethylene glycol eliminated is 62.1 g, and the amount of methanol that is produced by reaction between components (ii) and (i) and which is distilled out of the reaction system is 128.2 g. Hence, the amount of the resin obtained is $(93.1+92.1+388.4)-(6.21+128.2)=383.3$ g, and the amount of component (iii) with respect to the resin obtained is $(3.4/383.3)\times 100=0.89$ (% by weight).

The polyester resin that makes up the polymer backbone may be bonded to a terminal straight alkyl group in any fashion such as amido bond, imido bond, ester bond, urethane bond or urea bond, but to provide greater heat resistance, they are preferably bonded by amido bond, ester bond or imido bond. The straight alkyl group bonded to a terminal of the polyester resin must have at least 21 carbon atoms to provide good lubricating properties, and the desired lubricating properties are not achieved if said alkyl group has less than 21 carbon atoms. Briefly starting, if the terminal is represented by $(CH_2)_{n-1}CH_3$, n must be 21 or more. The alkyl group is preferably in a completely linear form, but it may be partially branched as long as the straight portion has at least 21 carbon atoms.

The reaction of components (i), (ii) and (iii) may be effected in either the absence or presence of a catalyst. Examples of effective catalysts include oxides or organic acid salts of metals such as zinc, lead, tin, cobalt, titanium, manganese, cadmium, barium and magnesium, and these catalysts are preferably used in an amount of about 0.01 to 5.0% by weight based on the total weight of the polybasic carboxylic acid or its derivative. It is also effective to use the reactants together with xylene or other aromatic hydrocarbons having a boiling point approximately equal to that of xylene. Such additional compounds are effective in preventing the sublimation of the poly-basic carboxylic acid or its derivative, and removing, by azeotropic distillation, the water in the reactants or water and lower alcohols that are formed by esterification or ester exchange reaction.

The reaction is effected under heating to produce a resin having the desired viscosity with care being taken not to form a gel, and the reaction vessel may be evacuated to promote the reaction. When a polymer of the desired viscosity is produced, a solvent is added to the reaction system before it gels, and at the same time, heat is removed to stop the reaction. In case of a formulation that involves difficulty in terminating the polymerization at the right time, a solvent such as cresol may be added to the reaction system before stopping the polymerization reaction, and the reaction may be effected with distilling off the solvent.

The respective components used to prepare the polyester resin that make up the insulation coating of the present invention are hereunder described individually. The polyhydric alcohol (component (i)) may be dihydric, trihydric or higher. Examples of the dihydric alcohol include ethylene glycol, diethylene glycol, triethylene glycol, 1,2-propylene glycol, 1,8-propanediol; various butanediols, pentanediols or hexanediols such as butane-1,3-diol, or butane-1,4-diol, pentane-1,5-diol, 2-butyn-1,4-diol, or 2,2-dimethylpropane-1,3-diol, 3-ethyl-2-butylpropane-1,3-diol, 1,4-dimethylolcyclohexane, butene-1,4-diol, hydrogenated bisphenols (i.e., hydrogenated p,p'-dihydroxydiphenylpropane or its analogs), cyclic glycol such as 2,2,4,4-tetramethylcyclobutane-1,3-diol, hydroquinone-di-β-hydroxyethyl ether, 1,4-cyclohexanedimethanol and 1,4-cyclohexanediethanol. Examples of the trihydric or higher alcohol include glycerin, pentaerythritol, 1,1,1-trimethylolethane, 1,1,1-trimethylolpropane, sorbitol, mannitol, dipentaerythritol, diglycerol, tris(hydroxyalkyl-)isocyanurates such as tris(β-hydroxyethyl)isocyanurate and tris(β-hydroxypropyl)isocyanurate. Other polyhydric alcohols are those prepared by reacting isocyanuric acid with epoxides (e.g., alkylene oxide, styrene oxide and epichlorohydrin). These polyhydric alcohols may be used either alone or in admixture. To provide insulated wires having high flexibility and heat resistance, ethylene glycol, glycerin and tris(β-hydroxyethyl)isocyanurate are preferred.

The polybasic carboxylic acid as component (ii) may be aromatic, alicyclic or aliphatic polycarboxylic acids. Specific examples thereof include terephthalic acid, phenyllindandicarboxylic acids of the formula:

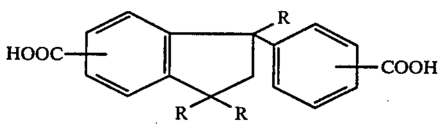

wherein R is hydrogen or an alkyl group having 1 to 3 carbon atoms such as 3-(4-carboxyphenyl)-5-indancarboxylic acid, 3-(3-carboxyphenyl)-5-indancarboxylic acid, 3-(3-carboxyphenyl-1,1,3-triethyl-6-indancarboxylic acid, 3-(4-carboxyphenyl)-1-methyl-1,3-dipropyl-5-indancarboxylic acid, and 3-(4-carboxyphenyl)-1-methyl-1,3-diethyl-6-indancarboxylic acid, phthalic acid, phthalic anhydride, hexahydroterephthalic acid, hexahydroisophthalic acid, adipic acid, fumaric acid, succinic acid, maleic acid, sebacic acid, isosebacic acid, dimeric acid, tetrachlorophthalic acid, hexachloroendomethylentetrahydrophthalic acid, 4,4'-dicarboxydiphenylmethane, 4,4'-dicarboxydiphenylpropane, benzophenonedicarboxylic acid, trimellitic acid, trimellitic anhydride, hemimellitic acid, memimellitic anhydride, trimesic acid and trimesic anhydride. Illustrative derivatives of polycarboxylic acid as component (ii) include lower alkyl esters of the acids listed above, such as (in case of terephthalic acid) dimethyl terephthalate, diethyl terephthalate, propyl terephthalate, butyl terephthalate, amyl terephthalate, hexyl terephthalate and octyl terephthalate; half-esters such as monomethyl terephthalate; aryl ester such as phenyl terephthalate and monophenyl trimellitate; and acid halides such as terephthalic acid dichloride, isophthalic acid dichloride, and trimellitic acid monochloride. These derivatives are used either alone or in combination. Particularly preferred are terephthalic acid, isophthalic acid, their derivatives and those wherein terephthalic acid, isophthalic acid or derivatives thereof are partially substituted by polybasic carboxylic acids having a five-membered imido ring which are illustrated below, because they provide insulated wires having high heat resistance. Polybasic carboxylic acids having a five-membered amido ring can be prepared by reacting, e.g., the following two compounds:

(a) aromatic carboxylic anhydrides having a five-membered cyclic carboxylic anhydride group and at least one other functional group. The latter functional group may be a carboxyl group, carboxylic anhydride group or hydroxyl group. The first mentioned cyclic carboxylic anhydride group may be replaced by a dibasic carboxyl group bonded to the adjacent carbon atom or an ester or half-ester thereof, as well as a half-amide with the primary amine mentioned in (b) below on the condition that it is capable of forming an imido group;

(b) Primary amines having a primary amino group and at least one other functional group. The latter functional group may be a carboxyl group, hydroxyl group or an primary amino group. The primary amine may be replaced by its salt, amides, lactams or polyamides on the condition that the bonded primary amino group is capable of forming an imide.

Illustrative examples of compounds (a) having a cyclic carboxylic anhydride group and at least one other functional group include tricarboxylic acid anhydrides such as trimellitic anhydride, hemimellitic anhydride, 1,2,5-naphthalenetricarboxylic acid anhydride, 2,3,6-naphthalenetricarboxylic acid anhydride, 1,8,4-naphthalenetricarboxylic acid anhydride, 3,4,4'-diphenyltricarboxylic acid anhydride, 3,4,4'-diphenylmethanetricarboxylic acid anhydride, 3,4,4'-diphenylether tricarboxylic acid anhydride, and 3,4,4'-benzophenonetricarboxylic acid anhydride; tetracarboxylic dianhydrides such as pyromellitic dianhydride, nellophanic dianhydride, 2,3,8,7-naphthalenetetracarboxylic dianhydride, 1,3,4,5-naphthalenetetracarboxylic dianhydride, 1,2,5,6-naphthalenetetracarboxylic dianhydride, 3,3',4,4'-diphenyltetracarboxylic dianhydride, 2,2',3,3'-diphenyltetracarboxylic dianhydride, 3,3',4,4'-diphenylethertetracarboxylic dianhydride, 3,3',4,4'-diphenylmethanetetracarboxylic dianhydride and 3,3',4,4'-benzophenonetetracarboxylic dianhydride, of these, trimellitic anhydride is particularly preferred. Other examples of the polycarboxylic acid that provides an imido group include aliphatic polybasic carboxylic acids such as butanetetracarboxylic acid and maleic anhydride.

Illustrative examples of compounds (b) having a primary amino group and at least one other functional group include primary diamines (preferably aromatic diamines) such as 4,4'-diaminodiphenylmethane, 4,4'-diaminodiphenylether, benzidine, 3,3'-diaminodiphenyl, 1,4-diaminonaphthalene, m-phenylenediamine, p-phenylenediamine, α,ω-nonamethylenediamine, 1,7-dimethylheptamethylenediamine, 4,4'-diaminodiphenylketone, bis(4-aminophenyl)-α,α-p-xylene, toluylenediamine, xylenediamine, xylylenediamine, hexamethylenediamine, ethylenediamine, 4,4'-dicyclohexylmethanediamine and diaminodiphenylsulfonbenzoguanamine; as well as aminoalcohols such as monoethanolamine, monopropanolamine and dimethylethanolamine, and aminocarboxylic acids such as glycine, aminopropionic acid, aminocaproic acid and aminobenzoic acid.

Compounds (a) and (b) are used in a ratio of 0.1 to 1.0 mole, preferably 0.5 to 1.0 mole, of (b) to 1 mole of (a) when (a) is a tricarboxylic acid anhydride and (b) is diamine. Compound (b) in excess of 0.5 mole reacts with the carboxyl group of the tricarboxylic acid anhydride to form an amido bond. If compound (a) is a tetracarboxylic acid dianhydride and compound (b) is diamine, the ratio of (b) to (a) is from 0.1 to 1.0 mole of (b) per mole of (a). If compound (a) is a tricarboxylic acid anhydride and (b) is monoamine, the ratio is from 0.1 to 2 moles, preferably from 1 to 2 moles, of (b) to 1 mole of (a). Component (b) is excess of 1 mole forms an amido bond or ester bond. In a particularly common case, (a) tricarboxylic acid anhydride and (b) aromatic diamine are used in an (a) to (b) molar ratio of 1:0.5 to 1:1. In the most preferred case, a carboxylic acid of the formula:

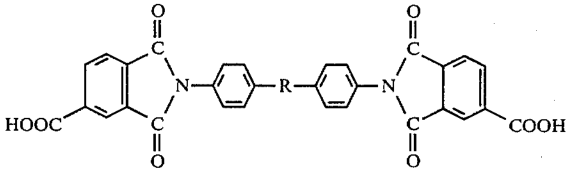

wherein R is —$CH_2$— or —O—, that is prepared by reacting 2 moles of trimellitic anhydride with 1 mole of 4,4'-diaminodiphenylmethane or 4,4'-diaminodiphenylether. Another preferred example is a polycarboxylic acid of the formula:

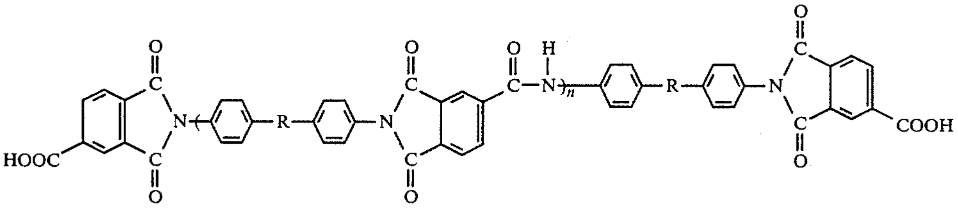

wherein n is not greater than 4 on average; and R is —$CH_2$— or —C—, that is prepared by reacting 2 moles of tricarboxylic acid anhydride with 1 to 2 moles of 4,4'-diaminophenylmethane or 4,4'-diaminodiphenylether. Other examples are polycarboxylic acids prepared by reacting 2 moles of the acid anhydride (a) with 0.1 to 2 moles, preferably 1.0 to 3.0 moles of polyisocyanates (c) such as phenylenediisocyanate, 2,4-tolylenediisocyanate, 2,6-tolylenediisocyanate, 1,2,5-triisocyanate benzene, diphenyl ether-4,4'-diisocyanate, diphenylmethane-4,4'-diisocyanate, diphenylsulfone-4,4'-diisocyanate, diphenyl thioether-4,4'-diisocyanate, naphthalenediisocyanate, polymethylenepolyphenylene, polyisocyanate, hexamethylene and xylylenediisocyanate. If tricarboxylic acid anhydrides are used as compound (a), polycarboxylic acids having an amido bond and a five-membered cyclic imido bond are produced. Tricarboxylic acid anhydrides are particularly often used as compound (a), and preferred polycarboxylic acids are those which are prepared by using trimellitic anhydride as compound (a) and diphenylmethane-4,4'-diisocyanate or diphenylenther-4,4'-diisocyanate as compound (b).

The reaction between compounds (a) and (b) or between (a) and (c) is effected either in the absence of solvents or in the presence of a solvent. In order to produce an imido-modified polyester resin, compounds (a) and (b) may be directly reacted with the polyhydric alcohol without preliminarily forming a polybasic carboxylic acid having a five-membered cyclic imido bond. Aromatic carboxylic acid anhydrides may be used as compound (b) after they are partially substituted with polybasic carboxylic acids to form an amido bond. Alternatively, polybasic carboxylic acids or their derivatives (acid halides) may be reacted with diamine in a molar ratio of 1:0.5 to 1:1 to form diamines having a terminal amino group or diamines having an amido group in the molecule. These diamines can also be used as compound (b) to produce imido- or amido-modified polyester resins.

For more details of the method for producing the polybasic carboxylic acids having a five-membered imido ring, see Japanese Patent Publication Nos. 21500/63, 9018/65, 27071/67 and 18816/70; Japanese Patent Application Nos. 43547/67, 43548/67, 89689/68 and 67497/69, which corresponds to Japanese Patent Publication Nos. 26116/72, 26117/72 and 26392/72, respectively; as well as U.S. Pat. No. 3,426,098 and French Pat. No. 2,009,052.

Alkylene carbonates may be used as both a reactant and a solvent for the synthesis of polybasic carboxylic acids having a five-membered imido ring in the molecule. For details of this technique, reference is made to Japanese Patent Publication Nos. 17837/73 and 17838/73. Acids containing a lactam ring as a heterocyclic ring other than the imido ring are also useful as a carboxylic acid component for synthesizing the polymer of the present invention, and details of the method for producing such acids are given in U.S. Pat. Nos. 2,626,223, 2,821,517 and 3,793,250, as well as Japanese Patent Publication No. 12198/73.

In the present invention, component (iii) is used to introduce an alkyl group at a terminal of at least one molecule of the polyester resin and has a straight alkyl group of 21 or more carbon atoms in the molecule, as well as a functional group capable of reacting with component (i) or (ii) described above. Examples of component (iii) are aliphatic acids, alkyl esters and acid halides thereof, as well as higher alcohols, amines and aliphatic acid amides. Illustrative examples of aliphatic acids include docosanoic acid, tricosanoic acid, tetracosanoic acid, pentacosanoic acid, hexacosanoic acid, heptacosanoic acid, octacosanoic acid, nonacosanoic acid and triacontanoic acid, and derivatives of these aliphatic acids are esters, acid anhydrides and acid halides. Illustrative examples of higher alcohols include n-heneicosanol, n-docosanol, n-tetracosanol, n-hexacosanol, n-octacosanol, and n-triacontanol. Illustrative examples of amines include heneicosylamine, docosylamine, tricosylamine, pentacosylamine, hexacosylamine, and octacosylamine. Illustrative examples of aliphatic acid amines include docosylamide, hexacosylamide and octacosylamide. These compounds need not be used individually and may be used in admixture. For instance, Hoechst Wax sold by Hoechst Japan, Ltd. that is based on montan wax acid (chain length: C 28-32), Hoechst Wax E (ester of montan wax acid) or Hoechst Wax OP (partially saponified ester of montan wax acid) also sold by Hoechst Japan, Ltd. may be used. Of the above listed compounds, aliphatic acids and ester derivatives thereof are preferred since they are highly reactive with component (i) or (ii) and permit easy removal of the by-products.

The wire enamel composition according to the present invention which primarily consists of a polyester resin at least one molecule of which is terminated with a straight alkyl group having 21 or more carbon atoms is either a polymer solution per se of the polyester resin at least one molecule of which is terminated with a straight alkyl group having 21 or more carbon atoms, or such polymer solution that contains one or more additives such as other thermoplastic resins, thermosetting resins, curing agents, fillers, pigments and dyes in an amount that does not impair the characteristics of said solution.

Solvents preferred for making the wire enamel composition are those which primarily consist of N-methyl-2-pyrrolidone, N,N-dimethylacetamide, m-cresol, p-cresol and various xylenols because the resulting polymer solution can be directly used as wire enamel for making enamelled wires. Suitable solvents that can be used to control the viscosity of the polymer solution are toluene, xylene, solvent naphtha, actone, methyl ethyl ketone, cyclohexanone and cellosolve acetate.

Metallic curing agents may be added to the wire enamel composition to promote the formation of a film during baking. Illustrative examples of metallic curing agents include octanoate, naphthenate, linolate and other salts of metals such as cobalt, manganese, lead, zinc, calcium, copper, iron, cerium, zirconium, aluminum, magnesium, cadmium, barium, nickel, lithium, tin, lanthanum, potassium and sodium. More specifically, they are lead octanoate, zinc octanoate, aluminum octanoate, cadmium octanoate, calcium octanoate, cobalt octanoate, manganese octanoate, lead naphthenate, zinc naphthenate, aluminum naphthenate, cadmium naphthenate, calcium naphthenate, manganese naphthenate and cobalt naphthenate. Other metallic curing agents include titanium tetraalkoxide or derivatives thereof (e.g., chelate compounds and acylate compounds of titanium tetraalkoxide, titanium dialkoxydiphenolate, and titanium bischelate compounds), and typical titanium tetraalkoxides are titanium tetrapropoxide, titanium tetraisopropoxide, titanium tetrabutoxide, titanium tetrahexoxide, and titanium tetraoctoxide. Chelate compounds of titanium tetraalkoxide are prepared by letting chelate reagents act on the titanium alkoxide, and chelate reagents are those compounds which are bonded to or coordinated with titanium to form a five- or six-membered ring. Illustrative examples of chelate reagents include β-diketones such as 2,4-pentanedione and 2,4-heptanedione; ketoesters such as methyl acetoacetate, ethyl acetoacetate and butyl acetoacetate; hydroxycarboxylic acids or esters or salts thereof such as lactic acid, methyl lactate, ethyl lactate, ammonium lactate salt, salicylic acid, methyl salicylate, ethyl salicylate, phenyl salicylate, malic acid, ethyl malate, tartaric acid, methyl tartrate, ethyl tartrate; ketoalcohols such as 4-hydroxy-4-methyl-2-pentanone, 4-hydroxy-2-pentanone, 4-hydroxy-2-pentanone and 4-hydroxy-4-methyl-2-heptanone; minoalcohols such as monoethanolamine, diethanolamine, triethanolamine, N-methylmonoethanolamine, N-methylmonoethanolamine, N,N-dimethylethanolamine and N,N-diethylethanolamine; enolic acitive hydrogen compounds such as diethyl malonate; methylol acrylamide, methylol melamine and methylol urea.

An example of the tetraalkyltitanium acylate compound is one that is prepared by reacting tetraalkyl titanate with stearic acid. An axample of titanium dialkoxydiphenolate is one that is prepared by reacting titanium tetraalkoxide with a phenolic compound, and preferred phenolic compounds are those which have one or more hydroxyl groups directly bonded to the aromatic nucleus, and not only phenols in the narrow sense of the term such as phenol and chlorophenol but also alkylphenols such as cresol, ethylphenol and xylenol; aromatic polybasic hydroxides such as hydroquinone and resorcin; and naphthols such as $\alpha$-naphthol and $\beta$-naphthol may be used with advantage.

Several examples of the titanium bischelate compounds are listed in Japanese Patent Publication No. 26628/67, such as titanium bis(acetylactone)diphenolate, titanium bis(acetylacetone)di-o-hydroxyphenol, titanium bis(acetylacetone)di-4-(p-hydroxyphenylisopropylidene)-phenolate, titanium bis(methylacetate)diphenolate, titanium bis(diethylmalonate)diphenolate, titanium bis(4-oxy-4-methylpentane-2-on)diphenolate, titanium (ethyllactate)-diphenolate, and titanium bis(N,N-dihydroxyethyl-2-aminoethoxy)diphenolate.

The polyester resin used in the present invention also acts as a polyester polyol, so a urethane-modified polyester wire enamel composition can be prepared by adding a stabilized isocyanate to the polyester resin. The insulation layer obtained by baking and curing a coating of the urethane-modified polyester wire enamel composition has a relatively small proportion of the terminal straight alkyl group, so needless to say, care must be taken to use a relatively large amount of component (iii) in consideration of the amount of the stabilized isocyanate to be added to the polyester polyol. As is well known, the stabilized isocyanate is prepared by reacting a polyisocyanate with a stabilizer that stabilizes the isocyanato group of the polyisocyanate. Useful stabilized issocyanates are Desmodur AP Stable and Desmodur CT Stable (both being available from Bayer Aktiengesellshaft), and Millionate MS-50 from Nippon Polyurethane Industry Co., Ltd.

The paint according to the present invention may be used in high concentrations or even substantially in the absence of solvents, and in the latter case, the wire enamel is preferably given a suitable degree of fluidity under heating at 60° C. or more, say 100° C. or more, to reduce its viscosity to a level suitable for the application job. Therefore, if a stabilized isocyanate is added to the wire enamel, it is preferably prepared by using as a stabilizer a monoalcohol or lactam that is capable of protecting the isocyanato group up to higher temperatures rather than a phenol that dissociates at fairly low temperatures to let free the isocyanato group.

The present invention is now described in greater detail by reference to the following examples and comparative examples which are given here for illustrative purposes only and are by no means intended to limit its scope. Unless otherwise noted, all reactions were effected in a reaction vessel under thorough stirring that comprised a 3-liter capacity for four-necked flask equipped with a cooling tube, a fractionating column, a thermometer and a stirrer. The reaction vessel was heated with a mantle heater. Baking of polymer solution coated wires was carried out in a vertical furnace at a furnace temperature of 360° C. in the top, 320° C. in the middle and 260° C. in the bottom as the wire was supplied at a linear speed of 15 m/min. All characteristics except the coefficient of static friction of the enamelled wires prepared were measured in accordance with JIS C3003 and NEMA MW-1000. The coefficient of static friction was measured by the following method in terms of the coefficient of static friction between enameled wires; two parallel enamelled wires were placed on a horizontal plane; a metal block to the bottom of which two parallel enamelled wires were fastened was placed on said horizontal plane so that the respective pairs of wires crossed each other at a right angle; the metal block was moved along the two wires on the horizontal plane; and the minimum load necessary for moving the block was divided by the weight of the block to determine the coefficient of static friction of the wires.

COMPARATIVE EXAMPLE 1

The following components were charged in a flask.

| | |
|---|---|
| Dimethyl Terephthalate | 388.4 g (2.0 moles) |
| Ethylene Glycol | 93.1 g (1.15 moles) |
| Glycerin | 92.1 g (1.0 mole) |
| Lead Acetate | 0.8 g |
| Xylene | 300.0 g |

Under stirring, the mixture was gradually heated to 140° C. at which temperature it was subjected to reaction for 2 hours. It was then heated at a rate of 20° C. per hour. Throughout the reaction, xylene and by-products were distilled out of the reaction system through the cooling tube. The viscosity of the mixture increased gradually. When the temperature of the mixture reached 240° C., the flask was evacuated and the reaction was continued at that temperature. The viscosity of the mixture increased further. Thirty minutes after the evacuation of the flask started, the pressure in the flask was returned to atmosphere and the heat was removed. Cresol was added to achieve a resin content of 40% and to dissolve the resin in cresol. Two percent by weight each of tetrabutyl titanate and zinc octanoate (based on the resin) was added to make a polyester wire enamel composition. The wire enamel had a viscosity of 72 poises. It was applied to a copper wire (1.0 mm$\phi$) in six layers which were individually baked. The characteristics of the resulting enamelled wire are shown in Table 1.

COMPARATIVE EXAMPLE 2

A polyester wire enamel composition was prepared as in Comparative Example 1 from a mixture of the following components:

| | |
|---|---|
| Dimethyl Terephthalate | 388.4 g (2.0 moles) |
| Ethylene Glycol | 93.1 g (1.5 moles) |
| Glycerin | 92.1 g (1.0 mole) |
| Methyl Myristate | 3.0 g |
| Lead Acetate | 0.8 g |
| Xylene | 300.0 g |

The wire enamel was applied to a copper wire and an enamelled wire was prepared as in Comparative Example 1.

COMPARATIVE EXAMPLES 3 AND 4

Polyester wire enamel compositions were prepared as in Comparative Example 2 except that methyl myristate was replaced by 3.0 g of methyl stearate (Comparative Example 3) and 30.0 g of methyl stearate (Comparative Example 4). Each paint composition was applied to a copper wire and enamelled wires were prepared as in Comparative Example 2.

EXAMPLES 1 AND 2

Polyester wire enamel compositions were prepared as in Comparative Example 2 except that methyl myristate was replaced by 3.0 g of methyl behenate (Example 1) and 3.0 g of octacosanoic acid (Example 2). Each wire enamel composition was applied to a copper wire and insulated wires were prepared as in Comparative Example 2.

TABLE 1

| | Component (iii) | No. of Carbon Atoms in Alkyl Group of Component (iii) | Proportion of Component (iii) (wt %) | Bare Diameter of Conductor (mm) | Overall Diameter (mm) | Film Thickness (mm) | Appearance | Flexibility | Repeated Scrape Test (times) | Coefficient of Static Friction |
|---|---|---|---|---|---|---|---|---|---|---|
| Comp. Ex. 1 | None | — | — | 1.000 | 1.070 | 0.035 | good | good | 51 | 0.27 |
| Comp. Ex. 2 | Methyl Myristate | 13 | 0.78 | 1.000 | 1.069 | 0.0345 | good | good | 48 | 0.25 |
| Comp. Ex. 3 | Methyl Stearate | 17 | 0.78 | 1.000 | 1.070 | 0.035 | good | good | 53 | 0.25 |
| Comp. Ex. 4 | Methyl Stearate | 17 | 7.83 | 1.000 | 1.070 | 0.035 | bad | good | 4 | 0.20 |
| Ex. 1 | Methyl Behenate | 21 | 0.78 | 1.000 | 1.070 | 0.035 | good | good | 52 | 0.12 |
| Ex. 2 | Octacosanoic Acid | 27 | 0.78 | 1.000 | 1.068 | 0.034 | good | good | 56 | 0.09 |

As Table 1 shows, the enamelled wires of Example 1 and 2 using the polyester resin at least one molecule of which was terminated with a straight alkyl group having 21 or more carbon atoms had a very low coefficient of static friction and hence had very good self-lubricating properties in comparison with the conventional insulated wire of comparative Example 1. The enameled wires of Comparative Examples 2 to 4 using a polyester resin wherein the terminal straight alkyl group had less than 21 carbon atoms did not have good self-lubricating properties, and even if more component (iii) was used to introduce more straight alkyl groups as in the sample of Comparative Example 4, its self-lubricating properties were little improved, and on the contrary, its appearance and mechanical characteristics were impaired.

COMPARATIVE EXAMPLE 5

The following components were charged in a flask:

| | |
|---|---|
| Dimethyl Isophthalate | 58.3 g (0.3 mole) |
| Dimethyl Terephthalate | 1106.9 g (5.7 moles) |
| Ethylene Glycol | 260.7 h (4.2 moles) |
| Glycerine | 276.3 g (3.0 moles) |
| Lead Acetate | 2.4 g |
| Xylene | 500 g |

Under stirring, the mixture was gradually heated to 140° C. at which temperature it was subjected to reaction for 2 hours. It was then heated at a rate of 20° C. per hour. Throughout the reaction, xylene and by-products were distilled out of the reaction system through the cooling tube. The viscosity of the mixture increased gradually. When the temperature of the mixture reached 240° C., the reaction was continued at that temperature for 30 minutes. Then, the flask was evacuated and the reaction was continued for 15 minutes. The pressure in the flask was then returned to atmosphere, and cresol was added to achieve a resin-content of 40% and the reaction was discontinued. Two percent by weight each of tetrabutyl titanate and zinc octanoate (based on the resin) was added to make a polyester wire enamel composition. The wire enamel referred to as A was applied to a copper wire (1.0 mmφ) in six layers which were individually baked to make an enamelled wire.

COMPARATIVE EXAMPLES 6 AND 7

Polyester wire enamel compositions were prepared by adding, to paint A, 1.5 parts by weight of methyl behenate (Comparative Example 6) and 1.5 parts by weight of methy octacosanoate (Comparative Example 7). Each wire enamel composition was applied to a copper wire and insulated wires were prepared as in Comparative Example 5.

EXAMPLE 3

A polyester wire enamel composition was prepared as in Comparative Example 5 using a formulation containing the following components:

| | |
|---|---|
| Dimethyl Isophthalate | 19.5 g (0.1 mole) |
| Dimethyl Terephthalate | 369.0 g (1.9 moles) |
| Ethylene Glycol | 86.9 g (1.4 moles) |
| Glycerin | 92.1 g (1.0 mole) |
| Methyl Octacosanoate | 5.75 g |
| Lead Acetate | 0.8 g |
| Xylene | 300.0 g |

The wire enamel was applied to a copper wire and an enamelled wire was prepared as in Comparative Example 5. The wire enamel remained uniform and transparent when it was left at room temperature for 4 months. When the samples of Comparative Examples 6 and 7 which simply contained component (iii) as a mixture component were left at room temperature for one week, insoluble matter precipitated and the samples turned opaque.

COMPARATIVE EXAMPLE 8

The following components were charged in a flask:

| | |
|---|---|
| Dimethyl Terephthalate | 388.4 g (2.0 moles) |
| Ethylene Glycol | 186.0 g (3.0 moles) |
| Glycerin | 184.2 g (2.0 moles) |
| Lead Acetate | 0.8 g |
| Xylene | 300.0 g |

Under stirring, the temperature of the mixture was elevated to 140° C. at which temperature the mixture was subjected to reaction for 1.5 hours. The temperature was further increased at a rate of 20° C. per hour. When the temperature reached 200° C., the reaction was further continued for one hour at that temperature.

Throughout the reaction, xylene and by-products were distilled out of the reaction system through the cooling tube. Then, the mixture was cooled to 110° C. and the following compounds were added to the reaction mixture:

4,4'-Diaminodiphenylmethane: 396.5 g (2.0 moles)
Trimellitic Anhydride: 768.5 g (4.0 moles)

When the temperature of the mixture was increased again, a yellow precipitate was formed and the mixture solidified. Then, the mixture was held at 140° C. for 30 minutes without stirring, and thereafter, it was heated to 180° C. over 3 hours. Throughout the reaction, water that was produced as a by-product was distilled out of the reaction system through the cooling tube. Since the mixture became somewhat fluid, it was heated to 230° C. over one hour under stirring, whereupon it became transparent and its viscosity increased gradually. The reaction was continued at 230° C. for 2 hours, and after the interior of the flask was evacuated, the reaction was further continued for one hour. Then the pressure in the flask was returned to atmosphere and immediately thereafter, cresol was added to achieve a resin content of about 35%. The reaction was discontinued and the mixture was dissolved in cresol. Two parts by weight each of tetrabutyl titanate and zinc octanoate (per 100 parts by weight of the resin) was added to make a polyester imide wire enamel composition which was referred to as paint B. The wire enamel was applied to a copper wire (1.0 mmϕ) in seven layers which were individually baked to prepare an enamelled wire.

COMPARATIVE EXAMPLE 9

A wire enamel composition was prepared by adding, to paint B, 1.5 parts by weight of Hoechst Wax E (the trade name for an ester of montan was acid from Hoechst Japan, Ltd.) per 100 parts by weight of the resin. This wire enamel was applied to a copper wire and an enamelled wire was prepared as in Comparative Example 8. When the wire enamel was left at room temperature for one week, insoluble matter precipitated and the wire enamel turned completely opaque.

EXAMPLE 4

The following components were charged in a flask:

| | |
|---|---|
| Dimethyl Terephthalate | 388.4 g (2.0 moles) |
| Ethylene Glycol | 186.2 g (3.0 moles) |
| Glycerin | 184.2 g (2.0 moles) |
| Hoechst Wax E | 23.8 g |
| Lead Acetate | 0.8 g |
| Xylene | 300.0 g |

Under stirring, the temperature of the mixture was elevated to 140° C. at which temperature, it was subjected to reaction for 1.5 hours. The temperature was further increased at a rate of 20° C. per hour. When the temperature reached 200° C., the reaction was further continued for one hour at that temperature. Throughout the reaction, xylene and by-product methanol were distilled out of the reaction system through the cooling tube. Then, the mixture was cooled to 110° C. and the following compounds were added to the reaction mixture:

4,4'-Diaminodiphenylmethane: 396.5 g (2.0 moles)
Trimellitic Anhydride: 768.5 g (4.0 moles)

When the temperature of the mixture was increased again, a yellow precipitate was formed and the mixture solidified. Then, the mixture was held at 140° C. for 30 minutes without stirring, and thereafter, it was heated to 180° C. over about one hour. Throughout the reaction, water that was produced as a by-product was distilled out of the reaction system through the cooling tube. Since the mixture became somewhat fluid, it was heated to 230° C. over one hour under stirring, whereupon it became transparent and its viscosity increased gradually. The reaction was continued at 230° C. for 2 hours, and after the interior of the flask was evacuated, the reaction was further continued for one hour. Then the pressure in the flask was returned to atmosphere and immediately thereafter, cresol was added to achieve a resin content of about 35%. The reaction was discontinued and the mixture was dissolved in cresol. Two parts by weight each of tetrabutyl titanate and zinc octanoate (per 100 parts by weight of the resin) was added to make a polyester imide wire enamel composition which was referred to as enamel C. The wire enamel was applied to a copper wire and an enamelled wire was made as in Comparative Example 8. Enamel C remained uniform and transparent when it was left at room temperature for one month.

The amount of component (iii) included in the polyester imide resin of enamel C was determined as follows: Since 3.0 moles of ethylene glycol and 2.0 moles of glycerin are used, the equivalent weight of component (i) is $3.0\times2+2.0\times3=12$. Two moles of 4,4'-diaminodiphenylmethane react with 4.0 moles of trimellitic anhydride according to the following scheme to form 2.0 moles of dicarboxylic acid containing two imido groups in the molecule:

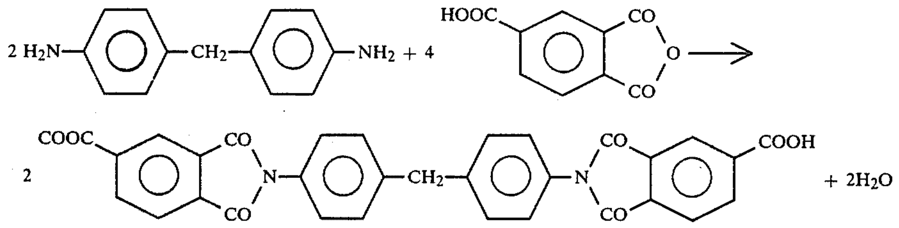

Since 2.0 moles of dimethyl terephthalate and 2.0 moles of the above diimide dicarboxylic acid are used, the equivalent weight of component (ii) is $2.0\times2+2.0\times2=8$. The amount of methanol removed as a result of reaction between dimethyl terephthalate and component (i) is 128.2 g. The amount of water removed as a result of formation of the diimide dicarboxylic acid and its reaction with component (i) is 72.1 g. The amount of excess ethylene glycol is 124.1 g. Therefore, the amount of the resin obtained is $(388.4+186.2+184.2+396.5+768.5)-(128.2+72.1+124.1)=1589.4$ g, and the amount of component (iii) included in the polyester imide resin is $(23.8/1589.4)\times100=1.50\%$.

The characteristics of the enamelled wires prepared in Comparative Examples 5 to 9 and Examples 4 and 5 are shown in Tables 2 and 3 below.

TABLE 2

| | Component (iii) | No. of Carbon Atoms in Alkyl Group of Component (iii) | Proportion of Component (iii) (wt %) | Characteristics of Enamelled Wires: Enamel Stability | Overall Dia. (mm) | Conductor Dia. (mm) |
|---|---|---|---|---|---|---|
| Comp. Ex. 5 | None | — | — | 4 months or more | 1.070 | 1.000 |
| Comp. Ex. 6 | None | — | — | Less than 1 week | 1.071 | 1.000 |
| | | | | 1.5 parts by weight of methyl behenate per 100 parts by weight of the resin was added to paint of Comp. Ex. 5. | | |
| Comp. Ex. 7 | None | — | — | Less than 1 week | 1.070 | 1.000 |
| | | | | 1.5 parts by weight of methyl octacosanoate per 100 parts by weight of the resin was added to paint of Comp. Ex. 5. | | |
| Ex. 3 | Methyl Octacosanoate | 27 | 1.50 | 4 months or more | 1.070 | 1.000 |

| | Film Thickness (mm) | Appearance | Flexibility (20% Quick Elongation) | Repeated Scrape Test (times) | Extraction by Methanol (%) | Coefficient Static of Friction |
|---|---|---|---|---|---|---|
| Comp. Ex. 5 | 0.035 | good | Could by wound around a rod of the same dia. with no cracking | 53 | 0.07 | 0.26 |
| Comp. Ex. 6 | 0.0355 | fair | Cracked at elongation | | 0.13 | 0.18 |
| | 1.5 parts by weight of methyl behenate per 100 parts by weight of the resin was added to paint of Comp. Ex. 5. | | | | | |
| Comp. Ex. 7 | 0.035 | fair | Cracked at elongation | 8 | 0.12 | 0.15 |
| | 1.5 parts by weight of methyl octacosanoate per 100 parts by weight of the resin was added to paint of Comp. Ex. 5. | | | | | |
| Ex. 3 | 0.035 | good | Could be wound around a rod of the same dia. with no cracking | 50 | 0.08 | 0.08 |

TABLE 3

| | Component (iii) | No. of Carbon Atoms in Alkyl Group of Component (iii) | Proportion of Component (iii) (wt %) | Characteristics of Enamelled Wires: Enamel Stability | Overall Dia. (mm) | Bare Conductor Diameter (mm) |
|---|---|---|---|---|---|---|
| Comp. Ex. 8 | None | — | — | 1 month or more | 1.068 | 1.000 |
| Comp. Ex. 9 | None | — | — | Less than 1 week | 1.070 | 1.000 |
| | | | | 1.5 parts by weight of montan wax acid ester per 100 parts by weight of resin was added to paint of Comp. Ex. 8. | | |
| Ex. 4 | Ester of Montan Wax Acid | 27-31 | 1.50 | 1 month or more | 1.070 | 1.000 |

| | Film Thickness (mm) | Appearance | Flexibility (20% Quick Elongation) | Repeated Scrape Test (times) | Extraction by Methanol (%) | Coefficient Static of Friction |
|---|---|---|---|---|---|---|
| Comp. Ex. 8 | 0.034 | good | Could be wound around a rod of the same diameter with no cracking | 51 | 0.04 | 0.23 |
| Comp. Ex. 9 | 0.035 | fair | Could be wound around a rod three times the wire diameter with no | 32 | 0.12 | 0.12 |

TABLE 3-continued

| | | | | | | |
|---|---|---|---|---|---|---|
| | | | cracking | | | |
| | 1.5 parts by weight of montan wax acid ester per 100 parts by weight of resin was added to paint of Comp. Ex. 8. | | | | | |
| Ex. 4 | 0.035 | good | Could be wound around a rod of the same diameter with no cracking | 68 | 0.05 | 0.07 |

As Tables 2 and 3 show, the enamelled wires of Examples 3 and 4 prepared according to the present invention had much better self-lubricating properties than the conventional samples prepared in Comparative Examples 5 and 8. The wire enamel compositions of Comparative Examples 6, 7 and 9 wherein component (iii) was included in the conventional polyester resin wire enamel simply as a mixture component did not have high stability during storage, and although the insulated wires using such paint compositions had somewhat improved self-lubricating properties, their appearance, mechanical and chemical characteristics were very low.

Preparation of paint D-1

The following components were charged in a flask:

| | |
|---|---|
| Ethylene Glycol | 124.1 g (2.0 moles) |
| Glycerin | 147.4 g (1.6 moles) |
| Dimethyl Terephthalate | 582.6 g (3.0 moles) |
| Hoechst Wax E (ester of montan wax acid from Hoechst Japan, Ltd.) | 6.6 g |
| Lead Acetate | 1.2 g |
| Xylene | 400.0 g |

Under stirring, the mixture was heated to 140° C. at which temperature it was subjected to reaction for 3 hours. Then, the mixture was heated at a rate of 20° C. per hour to 240° C. at which temperature the reaction was continued for our hour. The reaction was further continued under vacuum for 15 minutes. Then, 500 g of cresol was added to stop the reaction and dissolve the resin in cresol. More cresol and solvent naphtha ("Swasol #1000" from Maruzen Petrochemical Co., Ltd.) were added to dilute the resin to a resin content of about 40%. Two percent by weight each of tetrabutyl titanate and zinc octanoate (based on 100 parts by weight of the resin) was added to prepare a polyester paint composition which was referred to as Enamel D-1.

Preparation of Enamels D-2 and D-3

Polyester paint compositions were prepared as above except that 6.6 g of Hoechst Wax E was replaced by 9.9 g of Hoechst Wax S (montan wax acid from Hoechst Japan, Ltd.) and 19.8 g of Hoechst Wax E. The respective compositions were referred to as enamels D-2 and D-3.

Preparation of Enamel E-1

The following components were charged in a flask:

| | |
|---|---|
| Ethylene Glycol | 111.7 g (1.8 moles) |
| Glycerin | 110.5 g (1.2 moles) |
| Dimethyl Terephthalate | 233.0 g (1.2 moles) |
| Hoechst Wax E (ester of montan wax acid from Hoechst Japan, Ltd.) | 5.3 g |
| Lead Acetate | 0.5 g |
| Xylene | 300.0 g |

Under stirring, the mixture was heated to 140° C. at which temperature it was subjected to reaction for 2 hours. Then, the mixture was cooled to 100° C. Throughout the reaction, xylene and by-products were distilled out of the reaction system through the cooling tube. The following two compounds were added.

4,4'-Diaminodiphenylmethane: 237.9 g (1.2 moles)

Trimellitic Anhydride: 461.1 g (2.4 moles)

When the mixture was heated again, a yellow precipitate was formed in the mixture at about 120° C. and the mixture began to solidify, and at the same time, water was formed. The mixture was held at 140° C. for 30 minutes without stirring and then heated to 170° C. over about one hour, whereupon the mixture became somewhat fluid. So, it was further heated to 220° C. over one hour under stirring. As water was distilled off, the mixture became gradually transparent and its viscosity also increased slowly. After heating at 220° C. for 2 hours, the reaction system was evacuated and the reaction was further continued at 220° C. for 30 minutes. Then, cresol (800 g) was added to stop the reaction and dissolve the resin in cresol. More cresol and solvent naphtha ("Swasol #100" from Maruzen Petrochemical Co., Ltd.) were added to dilute the resin to a resin content of about 35%. Two percent by weight each of tetrabutyl titanate and zinc octanoate (based on 100 parts by weight of the resin) were added to make a polyester wire enamel composition, which was referred to as paint E-1.

Preparation of Enamels E-2 to E-4

Polyester imide wire enamel compositions were prepared as above except that 5.3 g of Hoechst Wax E was replaced by 15.9 g, 31.8 g and 53.0 g of the same wax. The respective wire enamel compositions were referred to as enamels E-2 to E-4.

Preparation of Enamel F

The following components were charged in a flask:

| | |
|---|---|
| Dimethyl Terephthalate | 194.2 g |
| Trimellitic Anhydride | 384.3 g |
| 4,4'-diaminodiphenylmethane | 198.3 g |
| Ethylene Glycol | 93.3 g |
| Tris(2-hydroethyl)isocyanurate | 261.2 g |
| Hoechst Wax E | 14.0 g |
| Lead Acetate | 0.3 g |
| Xylene | 200.0 g |

Under stirring, the mixture was heated to 140° C., at which temperature, it was subjected to reaction for 3 hours. Then, the mixture was heated to 240° C. over 5 hours and the reaction was continued at that temperature for one hour, then under vacuum for 30 minutes. The resulting resin was diluted with cresol to a resin content of 35%. Two percent by weight each of tetrabutyl titanate and zinc octanoate was added per 100 parts by weight of the resin to prepare a polyester imide wire enamel composition F.

EXAMPLES 5 to 7

Enemeled wires were prepared by applying polyester wire enamel samples D-1, D-2 and D-3 to copper wires (1.0 mmϕ) in six layers which were individually baked.

COMPARATIVE EXAMPLE 10

A commercial polyester wire enamel composition ("Delacoat E 220G" from Nitto Electric Industrial Co., Ltd.) was applied to a copper wire (1.0 mmϕ) in six layer which were individually baked to make an enamelled wire.

EXAMPLE 8

A commercial polyester wire enamel composition ("Delacoat E 220G" from Nitto Electric Industrial Co., Ltd.) was applied to a copper wire (1.0 mmϕ) in five layers which were individually baked. Then, the outermost layer of the insulation was coated with two layers of polyester wire enamel D-3 which were individually baked to make an enameled wire.

EXAMPLES 9 TO 12

Polyester imide wire enamel compositions E-1, E-2, E-3 and E-4 were applied to copper wires (1.0 mmϕ) in seven layers which were baked individually to make enamelled wires.

COMPARATIVE EXAMPLE 11

A commercial polyester imide wire enamel composition ("Isomid" from Nisshoku-Schenectady Co., Ltd.) was applied to a copper wire (1.0 mmϕ) in seven layers which were individually baked to make an enamelled wire.

EXAMPLES 13 TO 16

A commercial polyester imide wire enamel composition ("Isomid" from Nisshoku-Schenectady Co., Ltd.) was applied to copper wires (1.0 mmϕ) in five layers which were baked individually. Then, the outermost layer of each insulation was coated with two layers each of wire enamel samples D-2, F, E-2 and E-3 which were individually baked to make enamelled wires.

The characteristics of the enamelled wires prepared in Examples 5 to 8 and Comparative Example 10 are shown in Table 4, and those of the enamelled wires of Examples 9 to 16 and Comparative Example 11 are shown in Table 5. The results of the test for the long-term stability of the wire enamel compositions used to prepare the respective enamelled wires are also shown in Tables 4 and 5. The data clearly shows that the enamelled wires according to the present invention has far better self-lubricating properties than the conventional products. The overcoat made of wire enamel compositions primarily consisting of a polyester resin at least one molecule of which was terminated with a straight alkyl group having 21 or more carbon atoms exhibited good self-lubricating properties even if it was thin, and the characteristics of the undercoat were by no means impaired due to the overcoat.

TABLE 4

| | Under Coating Enamel | Component (iii) | Carbon Atoms in Alkyl Group of Component (iii) | Proportion of Component (wt %) | Enamel Stability | Over-Coating Enamel |
|---|---|---|---|---|---|---|
| Comp. Ex. 10 | Commercial product* | — | — | — | more than 4 months | none |
| Ex. 5 | D-1 | Ester of montan wax acid | 27–31 | 1.15 | more than 4 months | none |
| Ex. 6 | D-2 | Montan wax acid | 27–31 | 1.72 | more than 4 months | none |
| Ex. 7 | D-3 | Ester of montan wax acid | 27–31 | 3.44 | ca. 2 months | none |
| Ex. 8 | Commercial product* | — | — | — | more than 4 months | D-3 |

| | Characteristics of Enamelled Wires | | | | | | | | | |
|---|---|---|---|---|---|---|---|---|---|---|
| | Overall Dia. (mm) | Bare Conductor Dia. (mm) | Undercoat Thickness (mm) | Overcoat Thickness (mm) | Appearance | Flexibility (20% Rapid Elongation) | Repeated Scrape Wear Test (times) | Extraction by** Methanol (%) | Extraction by** Toluene (%) | Coefficient Static of Friction (%) |
| Comp. Ex. 10 | 1.072 | 1.000 | 0.036 | — | good | Could be wound around a rod of the same diameter with no cracking | 48 | 0.07 | 0.98 | 0.26 |
| Ex. 5 | 1.071 | 1.000 | 0.0355 | — | good | Could be wound around a rod of the same diameter with no cracking | 61 | 0.07 | 0.84 | 0.10 |
| Ex. 6 | 1.069 | 1.000 | 0.0345 | — | good | Could be wound around a rod of the same diameter with no cracking | 53 | 0.08 | 0.87 | 0.08 |
| Ex. 7 | 1.072 | 1.000 | 0.036 | — | good | Could be wound around a rod | 18 | 0.10 | 0.95 | 0.06 |

TABLE 4-continued

| | | | | | | | | | | |
|---|---|---|---|---|---|---|---|---|---|---|
| | | | | | | three times the wire dia. with no cracking | | | | |
| Ex. 8 | 1.068 | 1.000 | 0.027 | 0.007 | good | Same as in Ex. 5 | 49 | 0.08 | 0.97 | 0.07 |

*"Delacoat 220G" from Nitto Electric Industrial Co., Ltd.
**With Soxhlet extractor for 24 hours

TABLE 5

| | Undercoating Enamel | Proportion of Component (iii) (wt %) | Enamel Stablility | Overcoating Enamel | Overall Dia. (mm) | Bare Conductor Dia. (mm) | Undercoat Thickness (mm) | Overcoat Thickness (mm) |
|---|---|---|---|---|---|---|---|---|
| Comp. Ex. 11 | Commercial product* | — | 3 months or more | none | 1.070 | 1.000 | 0.035 | — |
| Ex. 9 | E-1 | 0.58 | 3 months or more | none | 1.071 | 1.000 | 0.0355 | — |
| Ex. 10 | E-2 | 1.74 | 3 months or more | none | 1.072 | 1.000 | 0.036 | — |
| Ex. 11 | E-3 | 3.47 | co. 2 months | none | 1.073 | 1.000 | 0.0365 | — |
| Ex. 12 | E-4 | 5.78 | co. 2 months | none | 1.073 | 1.000 | 0.0365 | — |
| Ex. 13 | Same as Comp. Ex. 11 | | | D-2 | 1.067 | 1.000 | 0.027 | 0.0065 |
| Ex. 14 | Same as Comp. Ex. 11 | | | F | 1.068 | 1.000 | 0.027 | 0.007 |
| Ex. 15 | Same as Comp. Ex. 11 | | | E-2 | 1.068 | 1.000 | 0.027 | 0.007 |
| Ex. 16 | Same as Comp. Ex. 11 | | | E-3 | 1.068 | 1.000 | 0.027 | 0.007 |

| | Appearance | Flexibility (20% Rapid Elongation) | Repeated Scrape Wear Test (times) | Extraction by** Methanol (%) | Coefficient Static Friction (%) |
|---|---|---|---|---|---|
| Comp. Ex. 11 | good | Could be wound around a rod of the same diameter with no cracking | 34 | 0.04 | 2.28 |
| Ex. 9 | good | Could be wound around a rod of the same diameter with no cracking | 47 | 0.05 | 0.10 |
| Ex. 10 | good | Could be wound around a rod of the same diameter with no cracking | 68 | 0.05 | 0.07 |
| Ex. 11 | good | Could be wound around a rod twice the wire diameter with no cracking | 39 | 0.06 | 0.06 |
| Ex. 12 | good | Could be wound around a rod twice the wire diameter with no cracking | 28 | 0.07 | 0.06 |
| Ex. 13 | good | Could be wound around a rod of the same diameter with no cracking | 70 | 0.05 | 0.07 |
| Ex. 14 | good | Could be wound around a rod of the same diameter with no cracking | 73 | 0.04 | 0.07 |
| Ex. 15 | good | Could be wound around a rod of the same diameter with no cracking | 98 | 0.05 | 0.06 |
| Ex. 16 | good | Could be wound around a rod of the same diameter with no cracking | 77 | 0.05 | 0.06 |

*"Isomid" from Nisshoku-Schenectady Co., Ltd.
**With Soxhlet extractor for 24 hours.

What is claimed is:

1. An enameled wire comprising a layer of baked insulation formed on a conductor either directly or through another insulation, wherein at least the outermost layer of said wire has an insulation coating formed by applying and baking a wire enamel composition consisting essentially of a polyester resin at least one molecule of which is terminated with an alkyl group having 21 or more carbon atoms prepared by reacting component (i) a polyhydric alcohol, component (ii) a polybasic carboxylic acid or a derivative thereof and component (iii) a compound that has a straight alkyl group having 21 or more carbon atoms in the molecule and which has a functional group capable of reaction with either component (i) or (ii), wherein component (iii) is used in an amount of from 0.4 to 6.0% by weight of the resin obtained.

2. An enamelled wire according to claim 1, wherein component (iii) is used in an amount of from 0.4 to 4.0% by weight of the resin obtained.

3. An enamelled wire according to claim 1, wherein the polyhydric alcohol is mainly composed of ethylene glycol and glycerin and/or tris-2-hydroxyethyl isocyanurate.

4. An enamelled wire according to claim 1, wherein the polybasic carboxylic acid is an aromatic polybasic carboxylic acid.

5. An enamelled wire according to claim 1, wherein the polybasic carboxylic acid is terephthalic acid.

6. An enamelled wire according to claim 1, wherein the polybasic carboxylic acid is terephthalic acid and a polybasic carboxylic acid having at least one five-membered cyclic imido group in the molecule.

7. An enamelled wire according to claim 6, wherein the polybasic carboxylic acid having at least one five-membered cyclic imido group in the molecule is a dicarboxylic acid represented by the formula:

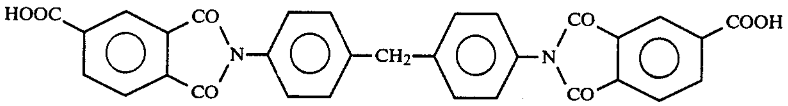

8. An enamelled wire according to claim 1, wherein component (iii) is an aliphatic monocarboxylic acid having a straight alkyl group having 21 or more carbon atoms or a derivative thereof.

9. An enamelled wire according to claim 1, wherein component (iii) is methyl behenate.

10. An enamelled wire according to claim 1, wherein component (iii) is montanic acid or a derivative thereof.

* * * * *